United States Patent
Herndon et al.

(10) Patent No.: US 6,249,290 B1
(45) Date of Patent: Jun. 19, 2001

(54) OBJECT ORIENTED ZOOMING GRAPHICAL USER INTERFACE

(75) Inventors: Kenneth Herndon, Suffern; Salvatore Cataudella, Brooklyn; Kathleen Cunningham, NY, all of NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/211,669

(22) Filed: Dec. 14, 1998

(51) Int. Cl.[7] .................................................. G06T 15/00
(52) U.S. Cl. ............................................ 345/439; 345/427
(58) Field of Search .................................. 345/419, 420, 345/427, 439, 433, 473

(56) References Cited

U.S. PATENT DOCUMENTS

| 5,276,785 | * | 1/1994 | Mackinlay et al. | 395/127 |
|---|---|---|---|---|
| 5,341,466 | | 8/1994 | Perlin | 395/139 |
| 5,596,346 | | 1/1997 | Leone | 345/127 |
| 5,596,690 | | 1/1997 | Stone | 395/133 |
| 5,608,850 | * | 3/1997 | Robertson | 395/127 |
| 5,615,384 | | 3/1997 | Allard | 395/800 |
| 5,617,114 | | 4/1997 | Bier | 345/113 |
| 5,689,628 | * | 11/1997 | Roberson | 395/127 |
| 5,732,230 | | 3/1998 | Cullen | 395/339 |
| 6,020,894 | * | 2/2000 | Silverbrook | 345/433 |

* cited by examiner

Primary Examiner—Mark Zimmerman
Assistant Examiner—Enrique L Santiago
(74) Attorney, Agent, or Firm—Christopher M. Tobin; Harold T. Fujii

(57) ABSTRACT

An object oriented zooming engine for providing a zooming graphical user interface is disclosed. The zooming engine includes classes that define zooming objects, an event manager, and a view manager. Events are received by the event manager, and alternatively assigned to the view manager or zooming objects for processing. The view manager and zooming objects have associated event handlers for providing event responsive behavior. Among the event handlers associated with the view manager is a pick handler that determines whether zooming objects in a zooming view have been targeted by an event. Thus, an event can be initially assigned to the view, and then assigned to the zooming objects within the view that may have been targeted. This allows more efficient handling of events and updating of the display, and provides a flexible system, where various behaviors can be variously and individually modified.

22 Claims, 14 Drawing Sheets

OBJECT ORIENTED ZOOMING GRAPHICAL USER INTERFACE

CROSS REFERENCE TO RELATED APPLICATIONS

This application is related to application Ser. No. 09/211,280 entitled "Interchangeable Pick Handler for Zooming Graphical User Interface," filed on Dec. 14, 1998 by Sal Cataudella, and application Ser. No. 09/211,666 entitled "Polymorphic Event Handling for Zooming Graphical User Interface," filed on Dec. 14, 1998 by Kenneth Herndon, Sal Cataudella, and Kathleen Cunningham.

BACKGROUND OF THE INVENTION

1. Field of the Invention

This application relates generally to computing architectures which may be used in conjunction with a graphical user interface, and more particularly to zooming graphical user interfaces.

2. Description of the Related Art

The available display screen area on a computer monitor has become increasingly inadequate in terms of the presentation of the variety of information and resources available to the user. In this regard, conventional computing systems have attempted to provide various solutions to address the problem of limited display screen area.

For example, windowing systems divide a screen into multiple tiled or overlapping display areas, resembling sheets of paper on a desktop, with one window in the foreground and others in the background. These windows remind the user that other information and control options are readily available to be brought to the foreground at the click of a mouse on an unobscured point in the window containing the desired material. However, such systems typically allow only a limited number of windows to be open and only the foreground window to be operable at any one time. In addition, information within a window that does not fit on the window's display screen area must be scrolled using an input device in order to access chosen information.

Another attempt to increase displayed information and control options is the use of hierarchical menuing through a sequence of display screens, offered to the user as a cascade of windows or a single designated screen area overwritten for each submenu. Typically, hierarchical menus rely upon information organized into decision trees. Abbreviating menuing options causes the menus to be less user friendly as menus do not always suggest sub-menu options. Further, cascaded windows introduce screen clutter and prevent the user from seeing all of the cascaded information simultaneously.

Zooming graphical user interfaces allow navigation into or out of the display screen, and can thus allow zooming graphical objects to be viewed from various perspectives at various levels of granularity. This provides the ability to variously view large numbers of objects at low resolution (e.g., by zooming away from them), or smaller numbers of objects at higher resolution (e.g., by zooming towards them). Thus, the user can review available resources from a broad perspective, and then focus with greater detail on particular resources.

SUMMARY OF THE INVENTION

Conventional zooming graphical user interfaces typically implement static hardcoded systems, which are inflexible in various aspects, and which are difficult to update. For example, certain conventional approaches implement look up tables for determining the behavior of displayed objects, and do not efficiently update the display responsive to requests by the user. What is needed is a graphical user interface with an architecture having improved flexibility, and more efficient functionality.

According certain aspects of the present invention, customized behavior can be associated with selected zooming objects, and the zooming view shown on the display is more efficiently updated responsive to events. These aspects are facilitated by providing separate management of the zooming view, and applying an event response scheme that implements a determination of whether the event pertains to the zooming view, or individual (or groups ) of zooming objects.

One embodiment of a zooming engine in accordance with the present invention implements an object oriented architecture including a class for defining zooming objects, a view manager, and an event manager. The zooming objects can variously reside in a zooming space. Dependent upon the perspective, certain of the zooming objects will appear in a zooming view. The view manager manages the zooming view by, among other things, identifying those zooming objects that reside in the zooming view. The event manager receives an event, such as the selection of a location in the zooming view via a user's mouse click, and determines whether the event pertains to the zooming view, or to a particular zooming object(s), whereupon the event is appropriately assigned. The object to which the event is assigned may be referred to as a target. This allows events to be more efficiently processed, as certain events can be handled on a view level, rather than requiring individual requests to each object in the zooming view.

According to another aspect of the present invention, one or more event handlers are associated with the zooming objects, and with the view manager. These event handlers allow the zooming objects (as well as the view) to have customized event responsive behavior. Additionally, a particular event handler may be associated with numerous zooming objects, and a particular zooming object can be associated with numerous event handlers, which provides better efficiency, allows easier behavioral updates, and minimizes code reproduction.

According to still another aspect of the present invention, the view manager implements a type of event handler, referred to as a pick handler, which responds to a view targeted event by identifying those zooming objects within the view that are then reassigned as the target for the event. Specifically, an event can be received by the event manager and assigned to the view manager as the target. The view manager then references its event handlers, including the pick handler, which identifies those objects in the zooming view that are targeted to process the event. The event can then be passed to the targeted zooming objects, which also have references to event handlers. These event handlers then provide particular event responsive behavior for the targeted zooming objects.

BRIEF DESCRIPTION OF THE DRAWINGS

These and other more detailed and specific features of the present invention are more fully disclosed in the following specification, reference being had to the accompanying drawings, in which.

DETAILED DESCRIPTION

Figure 1:
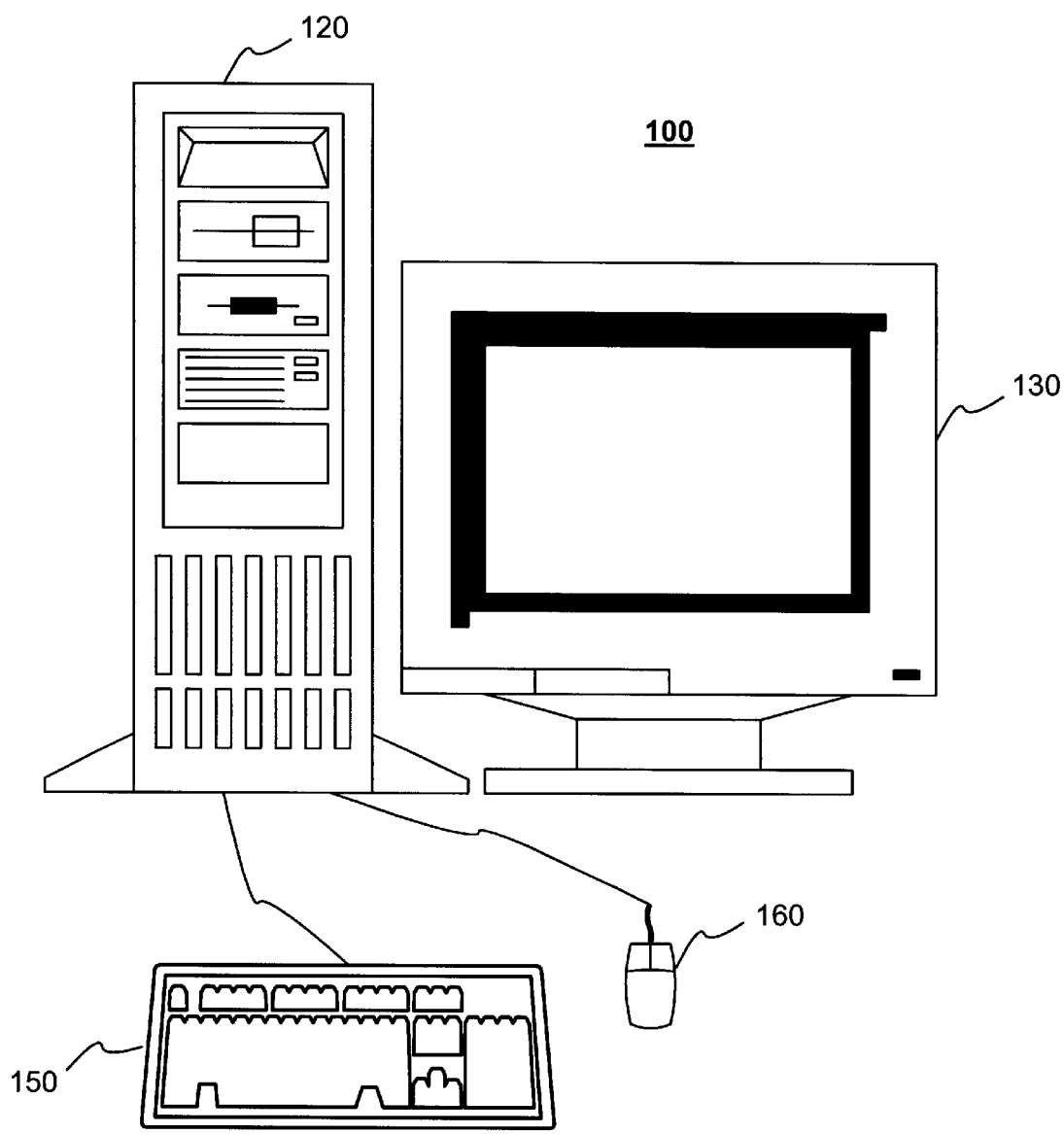
FIG. 1 is a schematic diagram illustrating a conventional computer system.

The schematic diagram of FIG. 1 shows an example of a computer system 100 which may be used in conjunction with embodiments of the present invention. The computer system 100 includes a main housing 120 connected to a monitor 130, keyboard 150, and mouse 160. The main housing 120 includes various items (not shown in FIG. 1) that are typically used in a computer system 100. By way of example, these elements may be a processor, ROM and RAM memory, cache memory, a hard disk storage device, a floppy disk drive, a storage tape drive, graphics and audio cards, a network interface card, and a power supply, all interconnected using a conventional architecture.

A computer system 100 configured as such provides visual output through a monitor 130 and audio output through speakers (not shown), and receives input through a keyboard 150, mouse 160, and microphone. The user can interface with the computer system 100 in conventional fashion, such as where the user moves a cursor about a graphical display and provides input using the mouse 160. For example, the user may use the mouse 160 to move a cursor over an icon for an application on the graphical display shown on the monitor 130, and may then use the mouse to double click on the icon to launch the application (cause it to be executed). The display and functionality may be referred to as a graphical user interface.

Although the illustrated computer system 100 is of the desktop type, it is noted that the present invention is equally applicable to other computer system types, such as the lap top type and palm type. Additionally, although the preferred embodiment implements a mouse for moving a cursor and providing input, it is noted that various technologies for accepting input and displaying output will evolve, and that such evolving technologies are contemplated by the present invention. For example, instead of mouse and keyboard commands, audio commands may be used to update the display. Furthermore, although a personal computer system is described in connection with this embodiment, the present invention encompasses other computer system environments. For example, a set top box for a television can include a processor and memory, and can be equipped with a zooming electronic programming guide driven by the zooming engine and corresponding functionalities of the present invention. In such embodiments input may, for example, be received from a remote commander using infrared signals, in lieu of mouse commands. These and other alternatives will be recognized by the ordinarily skilled artisan.

Figure 2:
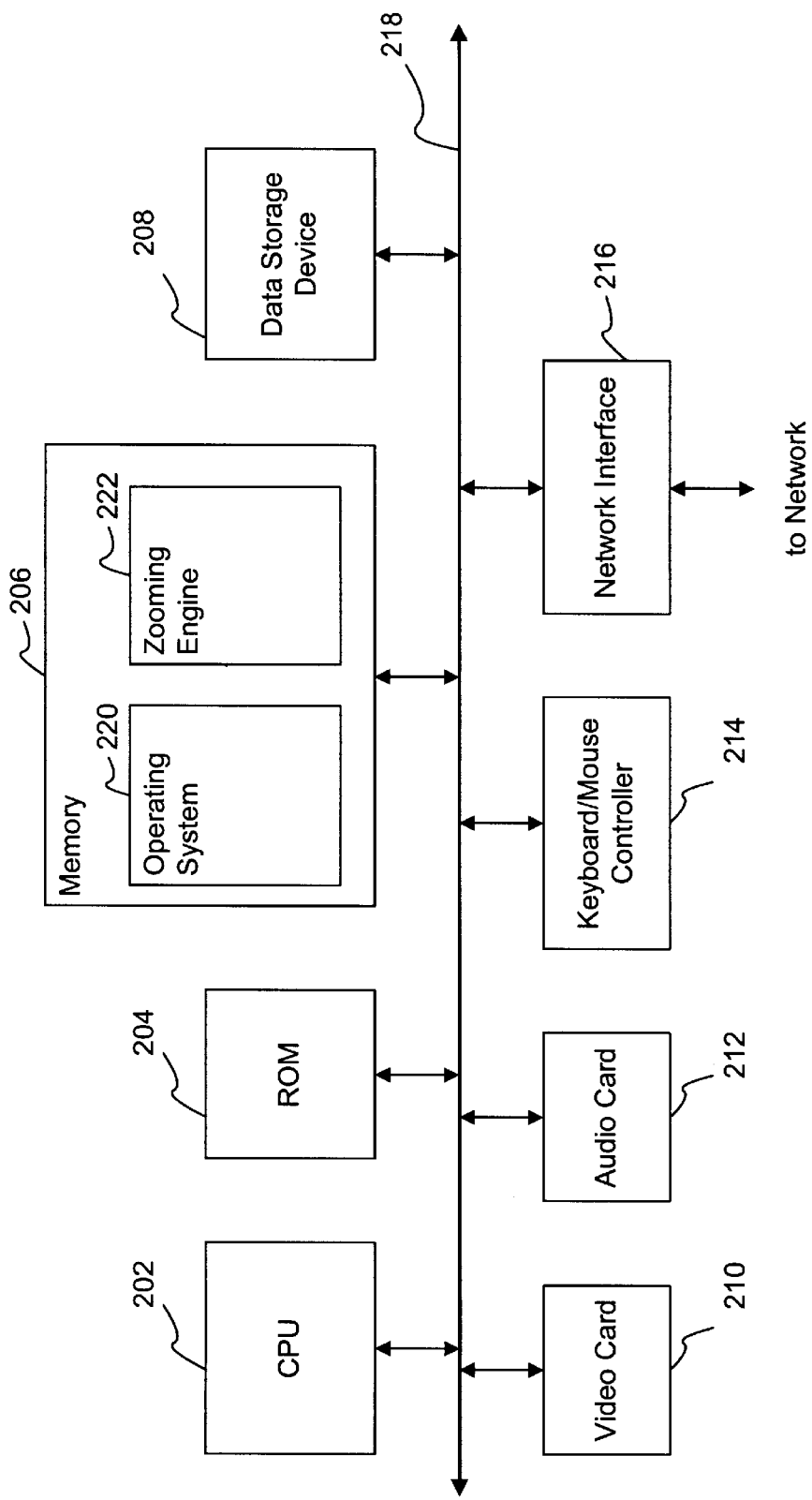
FIG. 2 is a block diagram illustrating a computer system having an embodiment of a zooming engine in accordance with the present invention.

The block diagram of FIG. 2 illustrates an embodiment of a computer 200 (the portion of the system 100 typically found in the main housing 120) that includes a CPU 202, ROM 204, memory 206, data storage device 208, video card 210, audio card 212, keyboard/mouse controller 214, and network interface 216, each coupled to a bus 218 in conventional fashion. The CPU 202 is a conventional processor, such as the PENTIUM™ type provided by Intel Corporation of Santa Clara, Calif. The CPU 202 executes instructions, such as those provided in ROM 204 and/or memory 206. ROM 204 is a read only memory, which retains its stored information even while it is disconnected from a power supply. The ROM 204 may, for example, store instructions for a boot up sequence. Memory 206 is preferably volatile memory for storing instructions and information used during ordinary operation, such as those provided in the computer operating system. The data storage device 208 provides long term data storage, and is preferably a magnetic or magneto-optic hard disk device. The video card 210 and audio card 212 respectively provide the interface between the computer 200 and the monitor and speakers. The keyboard mouse controller 214 interfaces the computer 200 and the keyboard and mouse that are used to provide input to the computer 200. The network interface 216 is a conventional network interface card that interfaces a local network line and the computer 200. The network interface card may be a conventional ethernet card, or may be a multipurpose interface for communication over a ethernet, ISDN and/or other networks. Access to the Internet can be provided through the network 15 interface 216.

It is noted that a computer 200 may include different items than those noted in the described embodiment. For example, I/O ports for interfacing with printers and plotters, a floppy disk drive, a CD ROM drive, and various other features may be included, and various elements may be excluded. Also, although Internet access is described in connection with a network interface card, a modem connected to a conventional phone line can be used to access the Internet, such as through an internet service provider. The ordinarily skilled artisan will recognize the various alternatives for the computer 200.

Still referring to FIG. 2, the memory 206 also includes an operating system 220 and a zooming engine 222. The operating system 220 is a program that is typically loaded from the long term data storage device 208 (e.g., hard disk) to the main memory 206 during a boot up sequence. The operating system 220 manages the other programs in the computer, which are referred to as applications, and includes particular instructions and operations that can be used by the applications, either directly or through an application program interface. The operating system 220 also handles exchanges to and from devices connected to the computer (e.g., printers, disk drives, etc.), manages memory use, and allocates computing resources in multitasking environments. Examples of operating systems 220 are WINDOWS95, WINDOWS98, and WINDOWS/NT as provided by Microsoft, Inc. of Redmond, Wash., or APERIOS as provided by Sony Corporation, Tokyo, Japan.

The zooming engine 222 includes instructions for updating the display 130 according to user and system input, including the zooming functionality described in connection with the present invention. For example, the zooming engine 222 manages the various zooming objects that may be provided in a zooming space, determines the available display space, determines which zooming objects are visible in the zooming view, and responds to various events to update the display, such as mouse and keyboard events which arise responsive to the user's navigation of the zooming space. Preferably, the zooming engine 222 is provided as software, although all or part of the zooming engine 222 may be provided as hardware, firmware, or a combination of software, hardware and firmware.

Figure 3A:
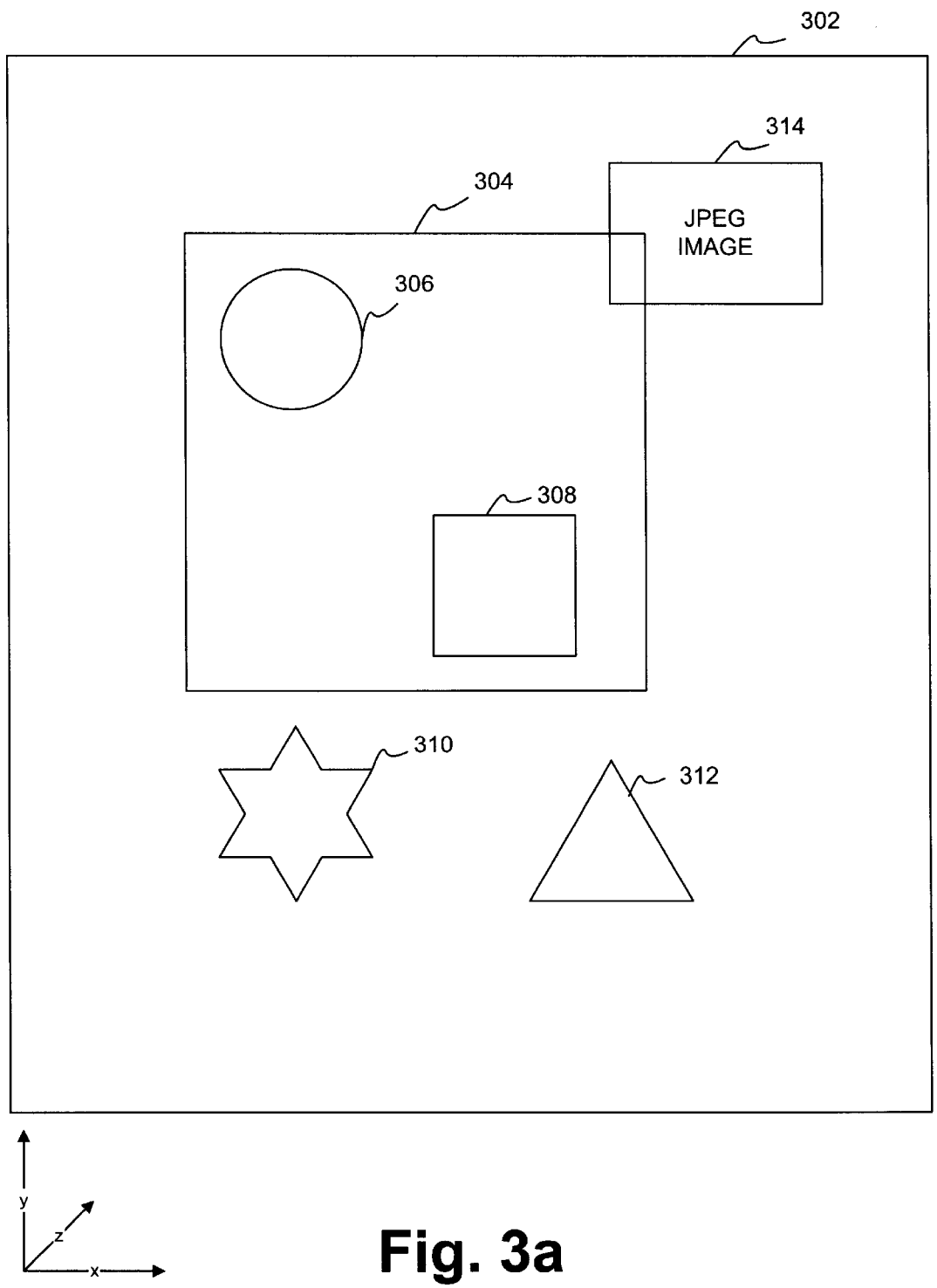
FIGS. 3A–3D are schematic diagrams illustrating various zooming display objects in a zooming space in accordance with the present invention.

The schematic diagrams of FIGS. 3A–3D illustrate the zooming space 302 and zooming view 304. For example, FIG. 3A illustrates a zooming space 302 including various zooming objects 306–314 including a circle 306, square 308, star 310, and triangle 312, which are graphical objects having particular sizes, shapes and colors. The edges of the zooming space 302 are shown for ease of illustration, and may not necessarily be part of the zooming space 302. The zooming space 302 may also include other types of zooming objects, such as complex still images, video images, or any type of object which may be displayed within the zooming space. Image objects may be photographs provided in conventional formats such as, without limitation, JPEG, GIF, BMP, Flashpix, and others. Video objects may comprise standard video such as AVI, Quicktime, MPEG, and others. For example, the zooming space 302 of FIG. 3A includes a JPEG image 314.

The zooming space 302 includes all of the zooming objects 306–314 that may be viewed by the user by navigating the zooming space 302. However, all of the zooming objects 306–314 might not be visible at a given time, since the zooming view 304 may not be large enough to encompass the entire zooming space 302. For example, here the zooming view 304 covers the circle 306, square 308 and a portion of the JPEG image 314. Typically, the zooming view 304 is dictated by the display device 130 and its configuration. Thus, the zooming view 304 may be the maximum display area for the display device 130. Additionally, in an environment where the zooming engine 222 works in conjunction with an operating system 220, the zooming view may be related to features provided by the operating system 220. For example, the usable display area for an open window in a WINDOWS operating system 220 may dictate the zooming view 304. Thus, the zooming view 304 can change by using conventional controls for maximizing the window, or altering the locations of the sides of the window.

Figure 3B:
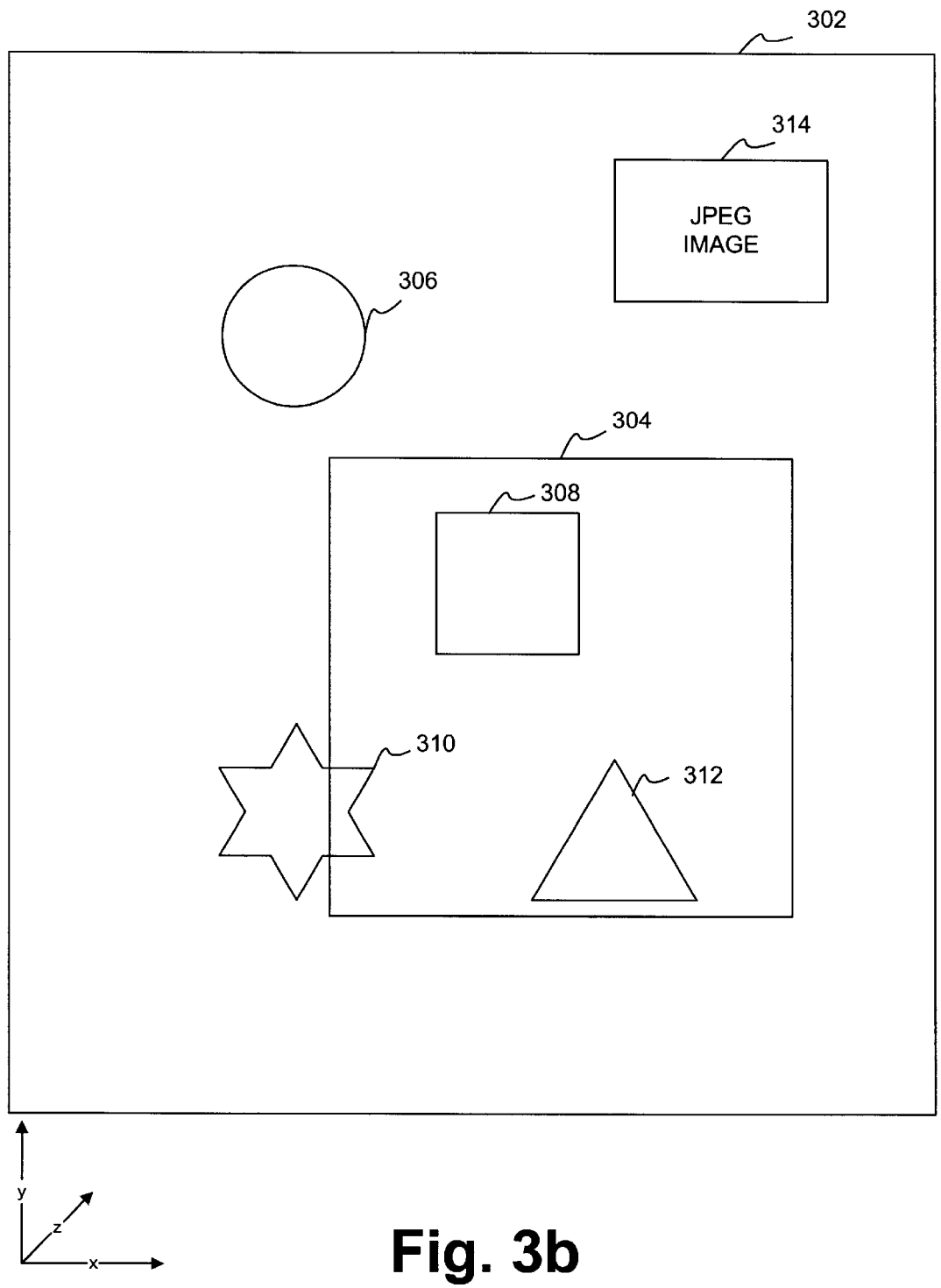

The user can navigate the zooming space 302 in three dimensions. Generally, movement in the X and Y directions (corresponding with the planar surface of the display) can be referred to as panning, while navigation in the Z direction can be referred to as zooming. Thus, for example, the zooming view 304 can navigate, or pan, down and to the right (+x,−y, 0), as shown in FIG. 3B, leaving the square 308, triangle 312, and a portion of the star 310 visible to the user. Such navigation can be responsive to conventional mouse commands, such as holding the right button down while the cursor is relocated, wherein the zooming view 304 follows the cursor.

Navigation in the Z direction (into or out of the display screen) causes the perspective of the zooming view 302 to zoom towards or away from the zooming objects in the zooming space 302. Navigation into the display screen causes the zooming objects to appear to become closer to the viewer, and thus larger. This may be referred to as "zooming in." This also causes the perceived separation of the zooming objects to increase, and may cause a zooming object to leave the zooming view 304.

Figure 3C:
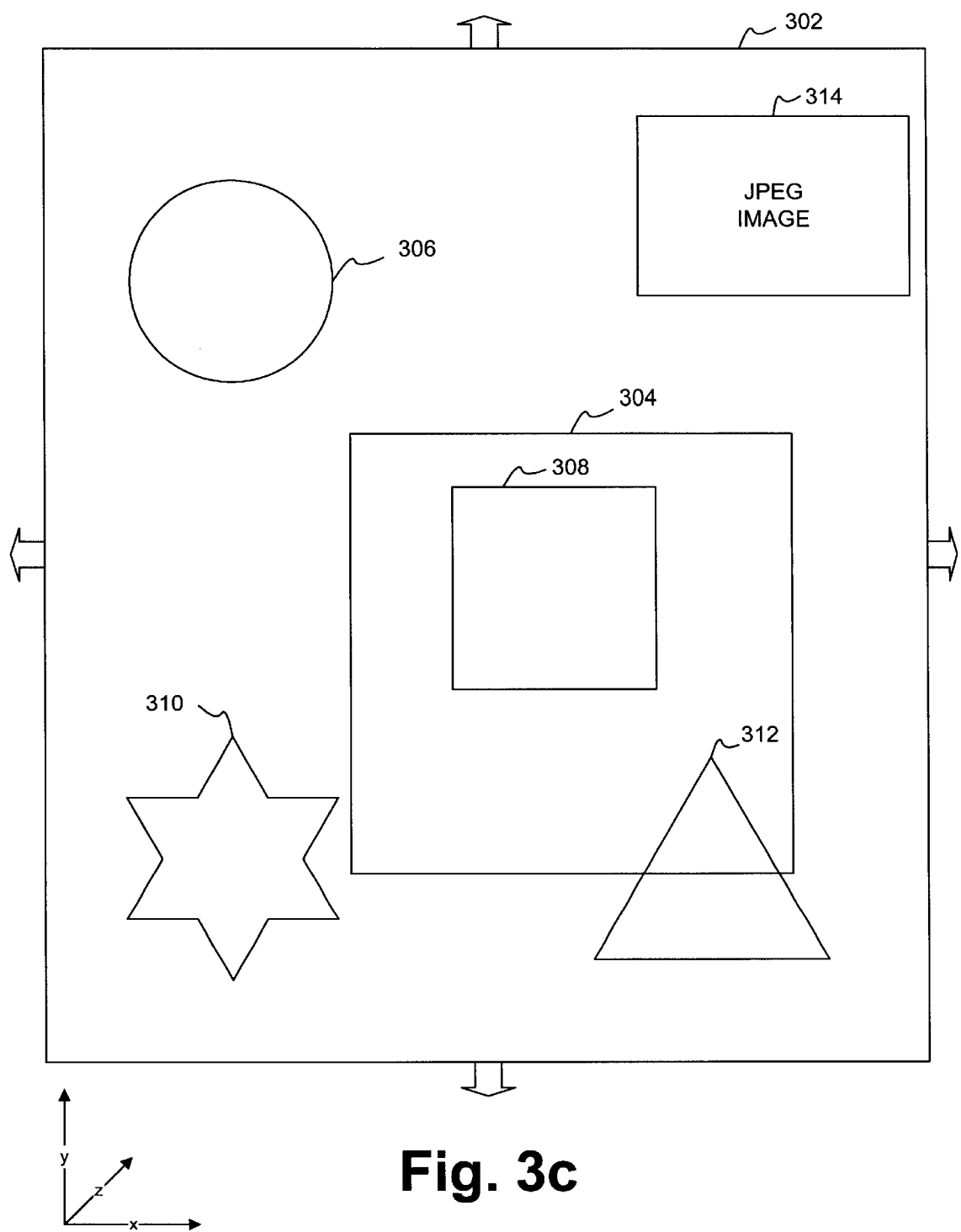

FIG. 3C illustrates zooming in (0, 0, +z) navigation relative to FIG. 3B, and shows the square 308 and triangle 312 to be larger, with the star having diverged out of the zooming view 304. The arrows along the "edges" of the zooming space 302 indicate the perceived expansion of the entire zooming space 302 because of the change in the relative location of the zooming view 304.

Navigation out of the display screen causes the zooming objects to appear to become further away from the user, and thus smaller. This may be referred to as "zooming out." Of course, as the user zooms out, the perceived separation of the zooming objects decreases as well, and additional zooming objects may come into the zooming view 304. Ultimately, sufficient zooming out navigation can cause the zooming view 304 to encompass all of the zooming objects in the zooming space 302. Additionally, zooming objects can fade away as they become too large to be viewed on the display. This may cause objects that were previously hidden behind the zooming object to appear. The artisan will recognize the various zooming functions that can be provided.

As with panning, the zooming navigation can be responsive to conventional mouse commands. For example, depressing the left mouse button can cause a zoom in, and depressing the same button with the keyboard shift key depressed can cause a zoom out.

Figure 3D:
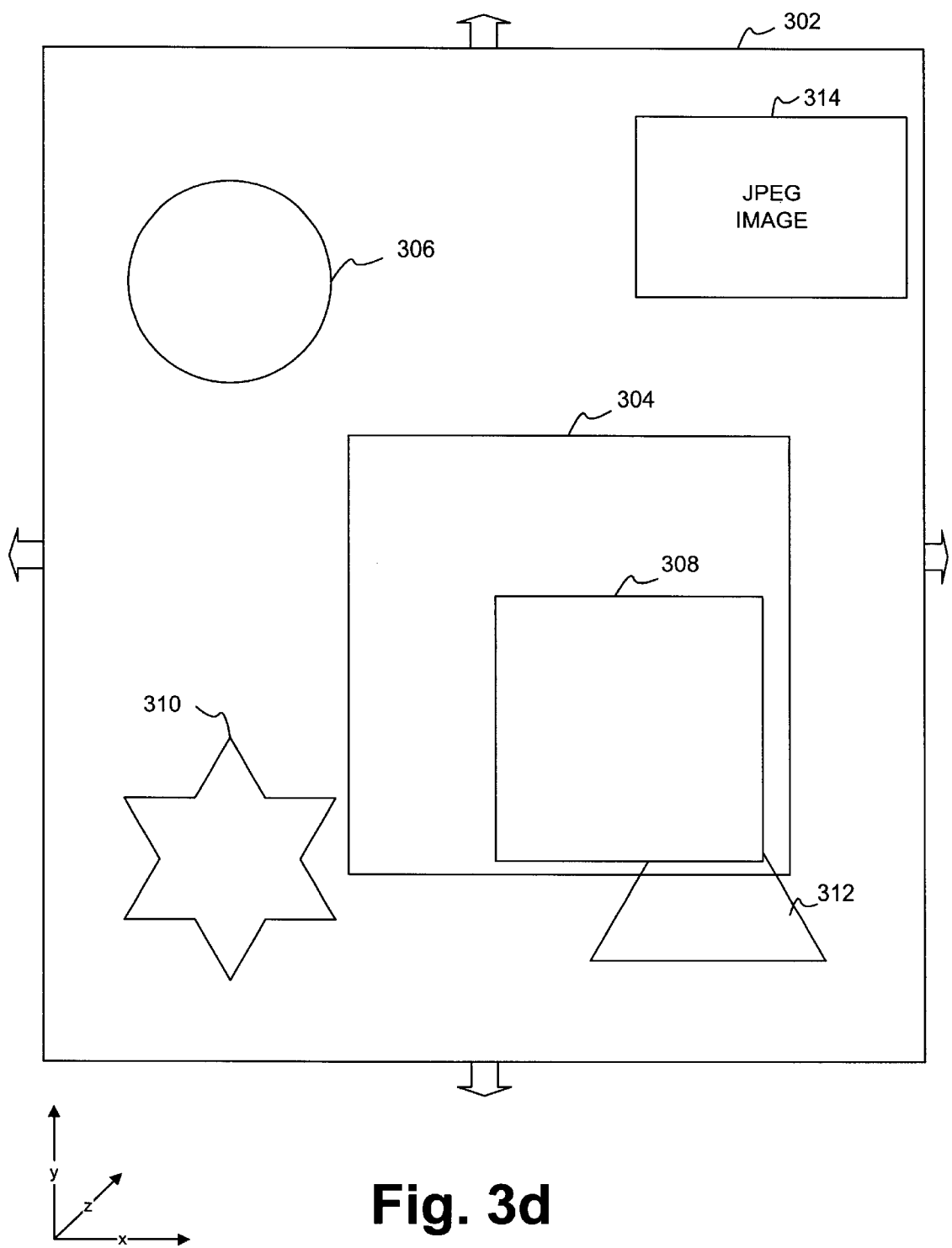

In addition to the relative manipulation of the zooming space 302 and zooming view 304, individual objects or groups of objects selected from the zooming objects 306–314 in the zooming space 302 may be manipulated. Thus, for example, a user can select one or more zooming objects and move them relative to the other zooming objects in any dimension. For example, FIG. 3D illustrates the square having been moved closer to the user in the Z direction, and slightly down and to the left in the Y and X directions (relative to the other zooming objects in the zooming space). This can be accomplished by selecting the object and then using mouse command based manipulation while it is selected.

Figure 4:
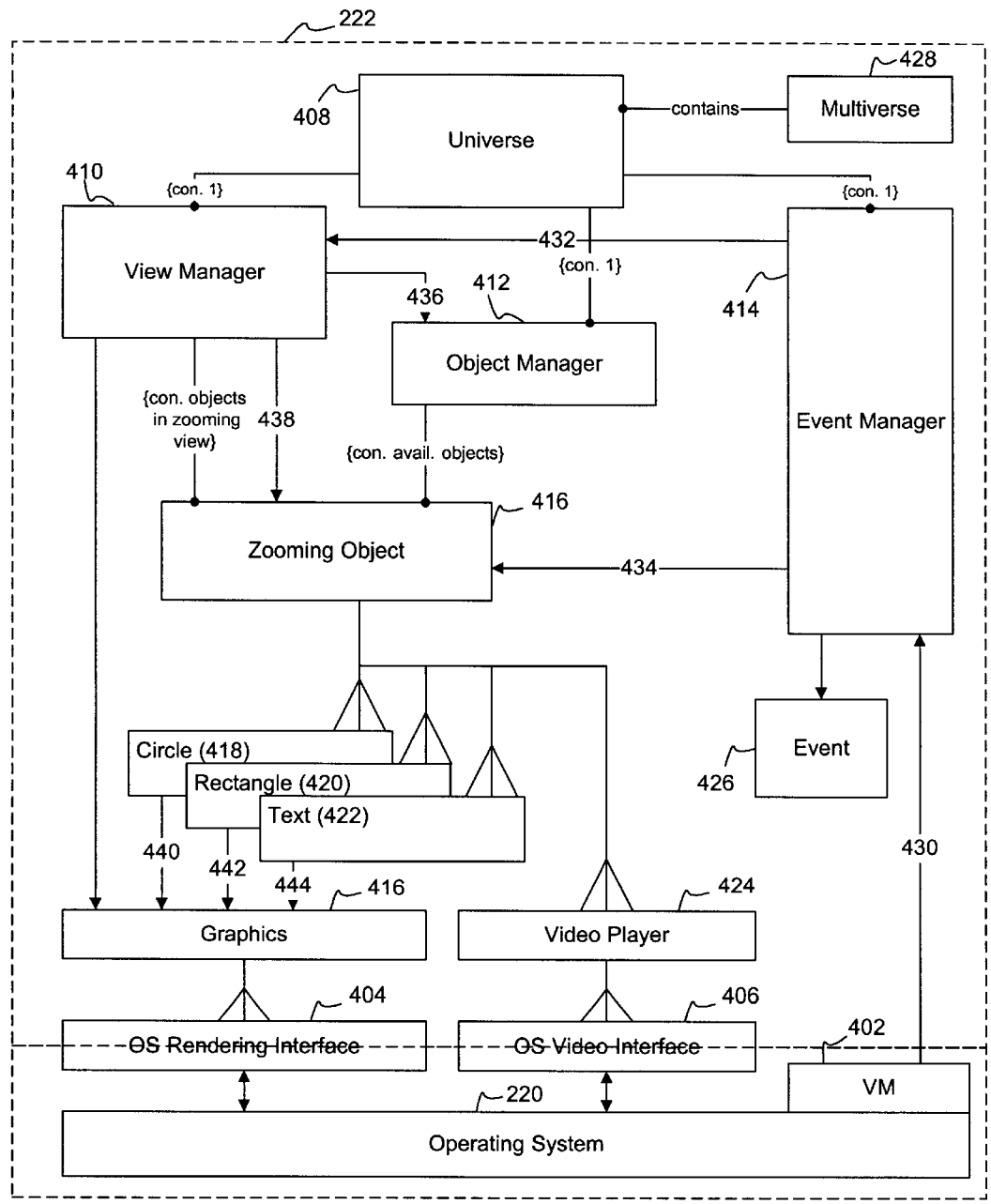
FIG. 4 is a block diagram illustrating an embodiment of the architecture for a zooming engine in accordance with the present invention.

The block diagram of FIG. 4 illustrates an embodiment of a zooming engine 222 architecture for facilitating zooming graphical user interface functionalities such as those described above. The zooming engine 222 operates with an operating system 220, as described above, and includes various instructions which are executed by a CPU for providing the zooming graphical user interface functionality.

Although various alternatives will be recognized once instructed according to the present invention, the preferred zooming engine 222 implements an object oriented architecture wherein multiple similar objects (such as zooming objects) can be part of the same class and inherit common functionalities.

Additionally, although the zooming engine 222 may operate in any environment which facilitates the execution of instructions, including platform dependent ones, the preferred zooming engine 222 embodiment is generally platform independent, running on a virtual machine 402. For zooming engine 222 embodiments implementing the Java programming language, provided by SUN Microsystems, the virtual machine 402 is a Java VM. Interfaces 404, 406 between the zooming engine 222 and operating system 220 may also be provided, such as those for rendering graphics 404 and video 406 using the operating system 220. These interfaces 404, 406 may comprise conventional facilities for interfacing with the operating system 220 such as dynamic link library (DLL) files, and/or the Microsoft DirectDraw and DirectShow SDK for the WINDOWS environment.

The zooming engine 222 includes a universe module 408 which is the highest level module corresponding to a given zooming space. The universe module 408 contains a view manager module 410, an object manager module 412, and an event manager module 414. These modules 408–414 each define an object class having corresponding characteristics and functions. Objects corresponding to the defined class can be referred to by the name of the module. For example, objects corresponding to the view manager module 410 can be referred to as a view manager object 410, or simply a view manager 410. In this embodiment, there is one instance of the view manager 410, object manager 412, and event manager 414 for each universe 408, and each has a global point of access, similar to a singleton class definition. Of course, other embodiments can include multiple instances of these objects.

The illustrated universe 408 and its subclasses pertain to a single zooming space. Multiple instances of zooming spaces may be provided, as the multiverse 428 may contain numerous zooming spaces which would each comprise their own universe 408 and appropriate subclasses.

The object manager 412 contains certain zooming objects in the zooming space, which zooming objects are defined by the zooming object module 416 as well as its subclasses such as the shown circle 418, rectangle 420, text 422, and video player 424 classes. Typically, the object manager 412 contains those zooming objects that are currently available for possible display (e.g., those zooming object currently in RAM), such as by storing references to the zooming objects (e.g., an index of the objects in RAM).

The zooming object 416 is the base class for zooming objects that reside in the zooming space 302 and are displayed in a zooming view 304. The branches, such as those shown between the zooming object 416 and the shown subclasses 418–424 indicate a one-to-many relationship. Specifically, there may be more than one circle 418 class, each inheriting the characteristics of the zooming object 416 class. There may be additional relationships which need not be shown for an understanding of the invention. For example, the zooming object 416 could have a "quadrilateral" subclass, which in turn could have "square" and "rectangle" subclasses.

The zooming engine 222 may interface with various operating systems 220. Where this is the case, the graphics module 416 interfaces the zooming engine 222 to the appropriate OS rendering interface 404. Similarly, there may be various different video player modules 424 as illustrated in FIG. 4, which in turn may be ported to various operating system 220 interfaces.

Alternatively, the zooming engine 222 may operate as a more pure Java embodiment which does not require the specific rendering and video interfaces in order to operate with a particular operating system 220.

The event manager 414 produces event objects 426 responsive to events (arrow 430) such as mouse and keyboard events initiated by the user (or events responsive to objects entering the zooming view, etc.). The event objects 426 are then passed along with event handling information to the view manager 410 (arrow 432) and/or the zooming object module 416 (arrow 434) so that the display can be appropriately updated.

Typically, the view module 410 contains those zooming objects currently in the zooming view 304, and obtains zooming object identification by requesting (436) the information from the object manager 412. They may be associated to the same index used by the object manager 412. The view manager 410 can issue requests (438) which are propagated through the object module 416 and any relevant subclass modules to affect rendering of many zooming objects contained in the zooming view. An example of an update for the zooming view 304 is where the user navigates the zooming space 302 such that the display characteristics (e.g., size) of zooming objects in the zooming view 304 change. (e.g., see FIG. 3B, 3C).

Individual or groups of zooming objects may be separately targeted to process an event, whereupon the event is passed to the zooming object by the event manager 414, and rendering commands would be more directly issued by the objects, such as is depicted by arrows 440–442. An example of such an update could be responsive to user selection and manipulation of a single object (e.g., see FIG. 3D).

One aspect of the present invention is the implementation of the above described object oriented architecture for the zooming engine 222, which facilitates improved operational efficiency and the improved introduction of modified functionality. Another aspect of the present invention improves the management of the zooming view 304 and zooming objects within the zooming view 304 by providing a method and corresponding architecture for responding to events by applying the event to the zooming view and/or certain zooming objects. According to still another aspect of the present invention, zooming objects are associated with one or more event handler objects, which further supports efficient operation, and allows easier zooming engine 222 updates since zooming objects may be related to various available event handler objects without unnecessary code reproduction, and since new event handler objects may be easily added to the zooming engine 222 for modifying functionality. These aspects of the present invention are further described with reference to the block diagrams of FIGS. 5 and 6, and the flow chart of FIG. 7.

Figure 5:
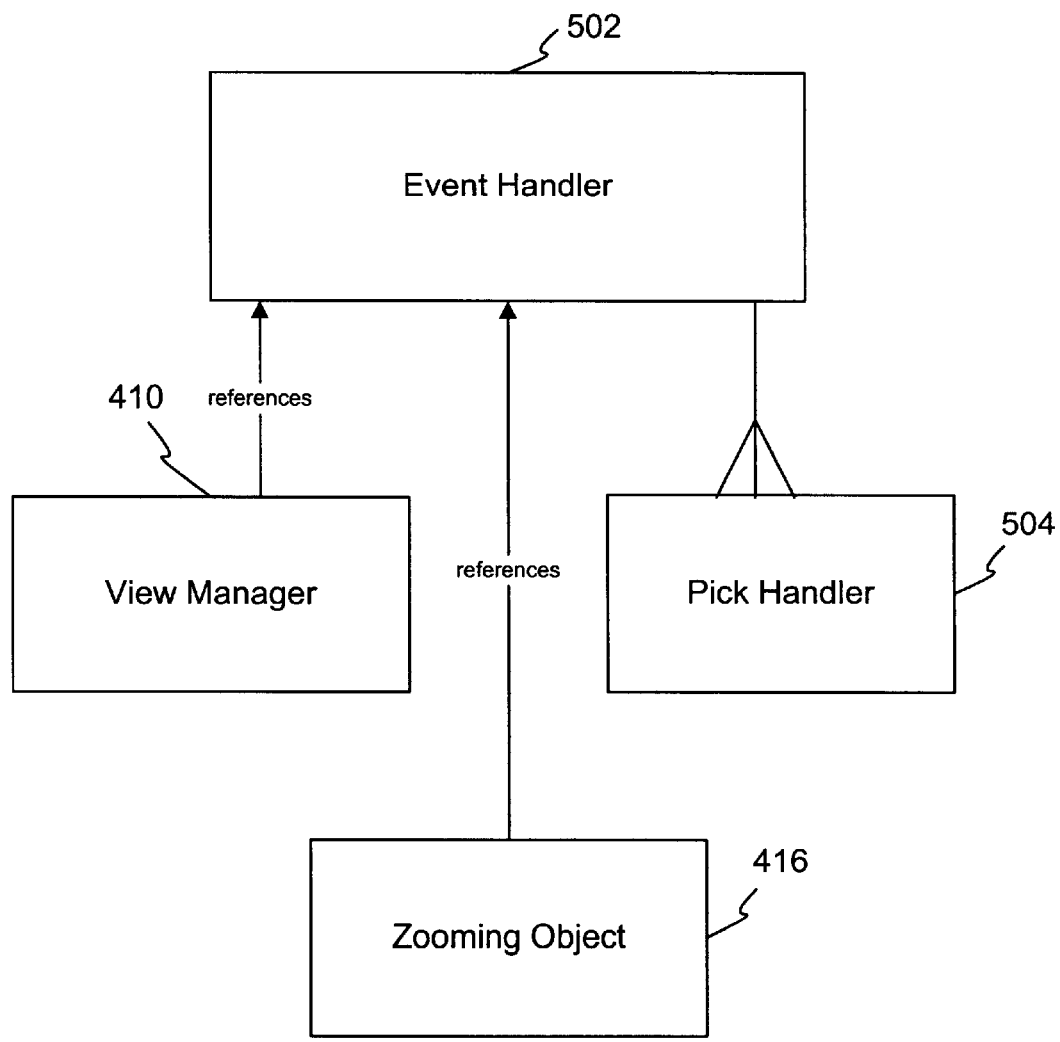
FIG. 5 is a block diagram illustrating an embodiment of an architecture for responding to an event in accordance with the present invention.

Both the view manager 410 and zooming object 416 implement one or more event handlers for responding to an event. As shown in FIG. 5, the event handler module 502 defines a class of objects which are referred to as event handler objects, or event handlers. Event handlers provide event responsive behavior for various objects, such as zooming objects. Many event handlers can be associated to a given zooming object to provide various aspects of its behavior. Additionally, classes of zooming objects can be associated to a given event handler. Event handlers can be installed on a zooming object at runtime. This is facilitated by calling a method to get the event handlers, and adding the corresponding event handlers.

Figure 6:
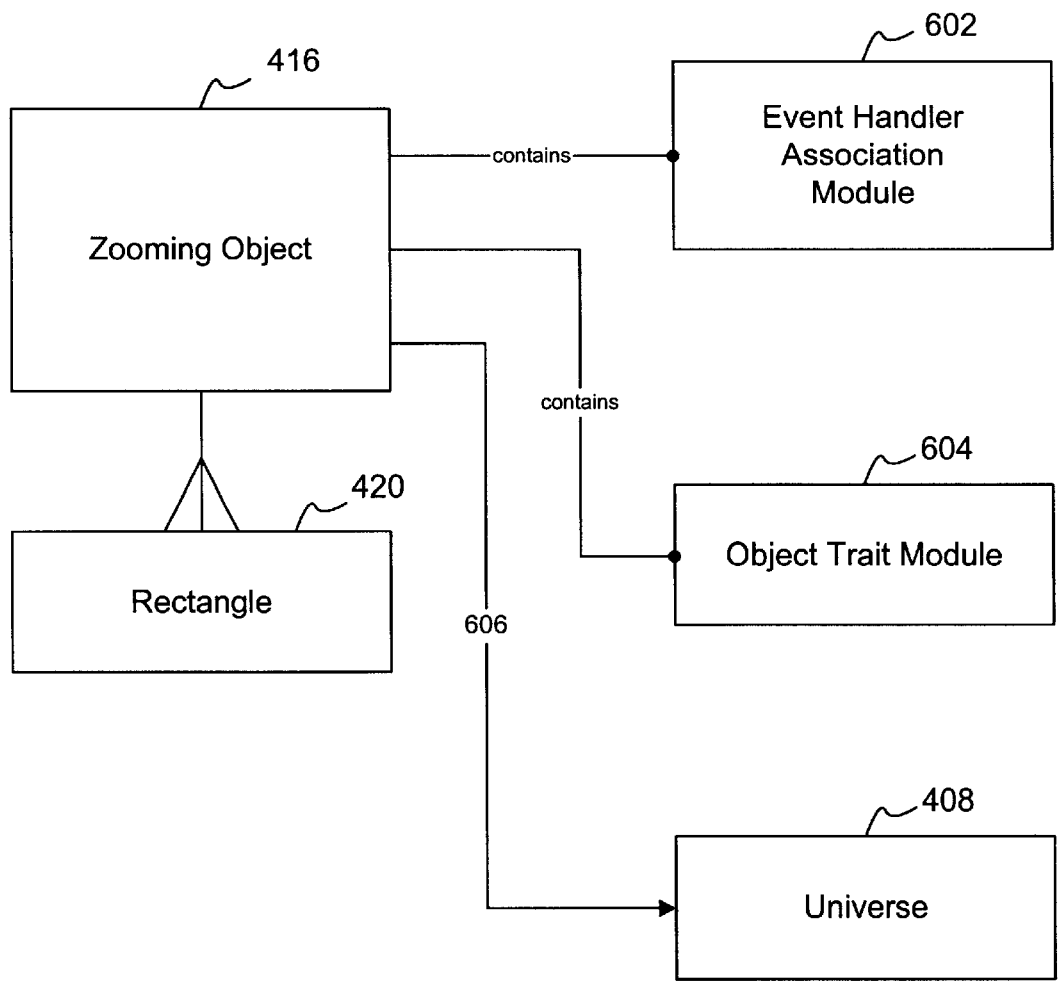
FIG. 6 is a block diagram illustrating an embodiment of the architecture for associating event handlers with zooming objects in accordance with the present invention.

The block diagram of FIG. 6 further illustrates the zooming engine 222 architecture, and how numerous event handler objects may be associated to a zooming object. References to event handler objects are preferably stored in traits or lists that are associated to zooming objects at the instance and class level. For example, an instance of a zooming object (e.g., a particular rectangle) has traits which include instance level references to event handlers. Also, the zooming object can be part of a class of zooming objects (e.g., the zooming object 416 class, and the rectangle subclass), which also have corresponding references to event handlers. The zooming object 416 contains a class event handler association module 602 and an object trait module 604. The class event handler association module 602 obtains the class level event handler object references. This can be facilitated by requesting (606) the information from the universe module 408, which provides the class level event handler references for the requester's class type. The instance level event handler lists are stored by the object trait module 604.

Preferably, an event is processed according to the event handlers (instance and class) associated with the zooming object, with the instance level event handlers being invoked first, followed by the class level event handlers. Each event handler has the option to consume the event, whereupon it is not propagated to the next event handler.

One type of event handler is a pick handler. The pick handler has a picking policy for determining whether certain zooming objects have been targeted to process the event. For example, the pick handler can determine which zooming objects have been encompassed by a mouse click, and this determination can allow the passage of the event to any event handlers installed on the picked objects. The view manager 410 references a pick handler object for determining which zooming objects (if any) contained in the zooming view 304 are targeted to process an event.

Still referring to FIG. 5, the pick handler module 504 defines the class of pick handler objects ("pick handlers") which, like other event handlers, can be associated with zooming objects to provide certain behavioral aspects (here, the characteristics relating to how object can be picked). References to pick handlers are included in the event handler object reference lists for the view manager 410, which uses a pick handler to determine whether objects in the zooming view are targeted to process events.

Figure 7:
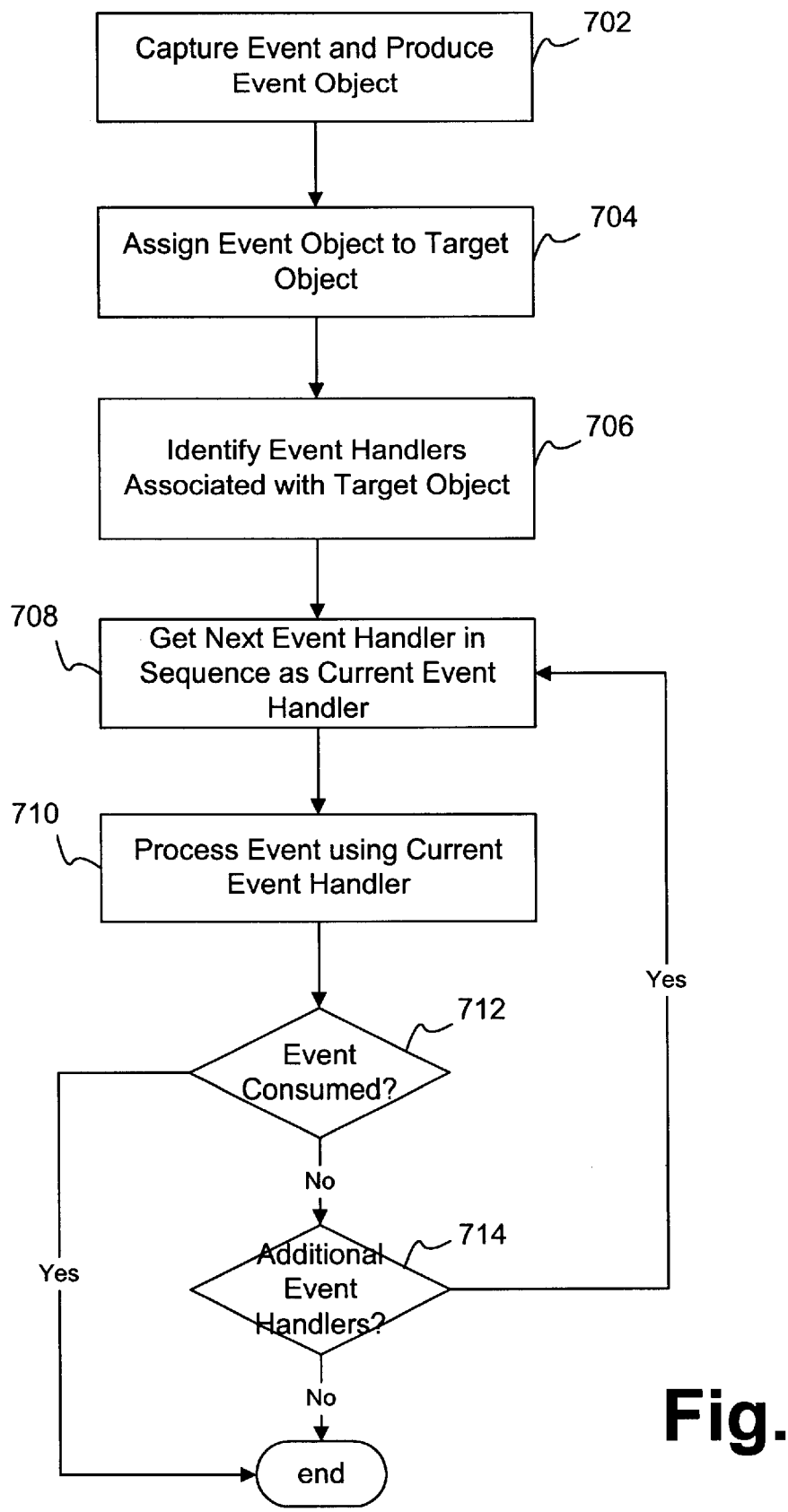
FIG. 7 is a flow chart illustrating an embodiment of responding to an event in accordance with the present invention.

Referring to the flow chart of FIG. 7 along with the block diagrams of FIGS. 4–6, an embodiment of responding to an event according to this aspect of the present invention is now further described.

In step 702, a system event is captured and an event object is produced. Specifically, the event manager 414 receives the event, and responds to the event by creating an appropriate instance of an event object 426. Notably, the event object can have various subclass instances, such as system event, mouse event and keyboard event subclasses (not shown). In such a case, the event manager 414 can create the appropriate subclass instance for the received event.

In step 704, the event object is assigned to a target object. For example, if the event object pertains to the zooming view, then the target object is the view manager 410. However, if the event object pertains to a particular zooming object, then the target object is that zooming object. Preferably, the event object 426 includes a field which identifies the target. This field can be examined to identify the target, and can also be changed where the target changes. The event manager 414 can access this field to identify and change targets. The event manager 414 can also make an initial determination about the target for an event. For example, the event manager 414 can set the view as the target responsive to an initial mouse or keyboard event, if the event has not been grabbed by an event handler.

The target object processes the event object by accessing the event handlers associated with the target (step 706). The next event handler object is obtained as the current event handler (step 708), the event is processed according to the current event handler (step 710), and provided that the event is not consumed by the current event handler (step 712), additional event handlers in the sequence are sought (step 714), which are then obtained (708) and processed (710) in similar fashion.

Figure 8:
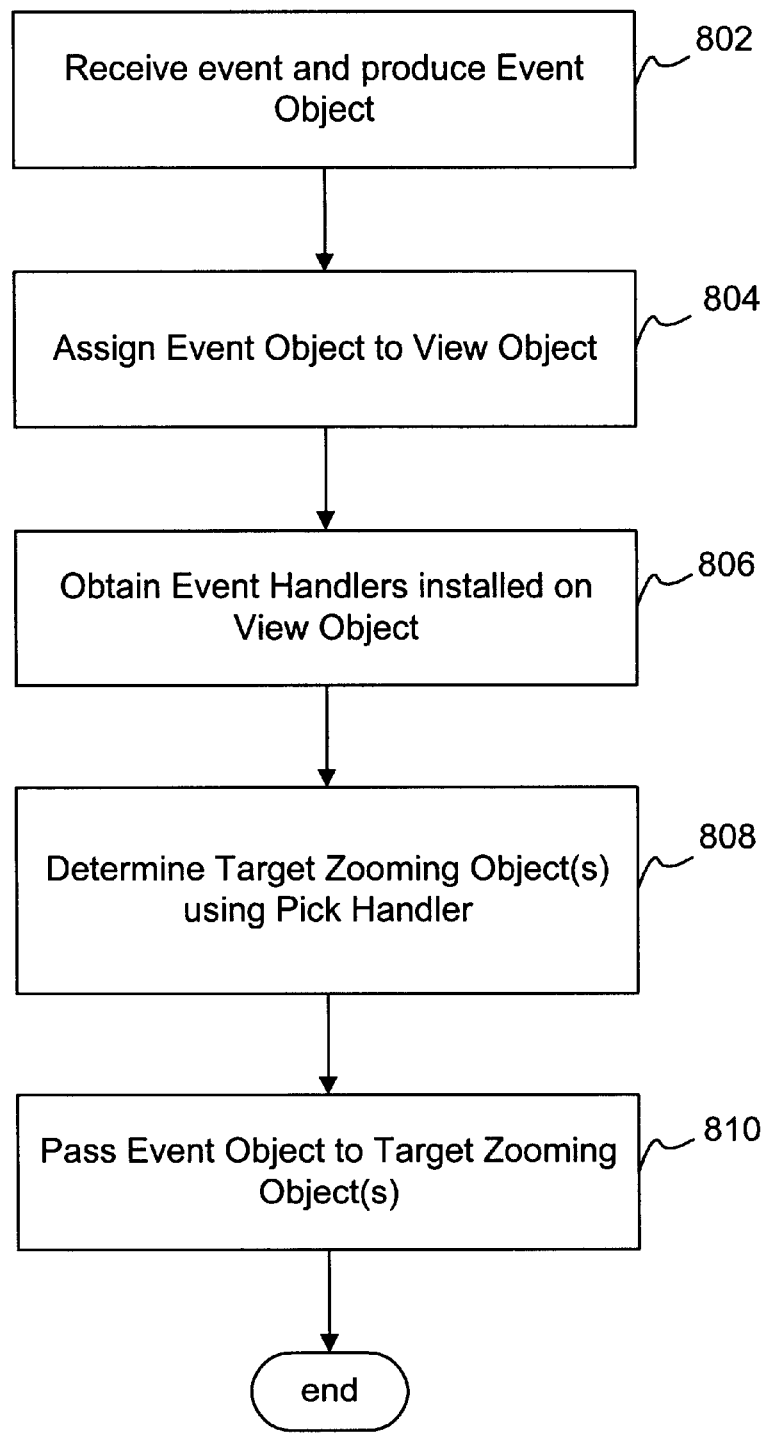
FIG. 8 is a flow chart illustrating an embodiment of implementing a pick handler to determine whether zooming objects reside in a zooming view in accordance with the present invention.

The flow chart of FIG. 8 illustrates an example of responding to an event relating to one or more objects in the zooming view 304, wherein the view manager 410 is the initial target for processing the event. For example, the event may be clicking on a zooming object in the zooming view 304. More specifically, the user may select a single zooming object with a mouse and move it relative to other zooming objects as shown in FIGS. 3C–3D. Although this example is used to illustrate the response to an event, various other events can be processed. For example, keyboard events can be processed, or the user may select groups of zooming objects, zoom in, etc. dependent upon the configuration of the system and the user's desires.

As shown in step 802, the event is received by the event manager 414 which originates the event object, and then determines the target object as described above. In this example, the target is the view, so the event object 426 is assigned to the view manager (step 804).

In step 806, the event handlers installed on the view manager 410 are obtained, such as by accessing its event handler list as described above. Typically, the first event handler installed on the view is a pick handler, which determines which object(s), if any, are targeted to respond to the event. Those zooming object(s) that have been targeted for selected are determined to be the new target objects, as shown in step 808. In the described example, the zooming object the user clicks on becomes the new target.

Finally, the event object is passed to the new target object which processes the event with its associated event handlers, as shown in step 810. One example of an event that can be handled by the targeted zooming object can be the movement of the zooming object. This can be done using event handlers that look for the appropriate commands (e.g. a combination of mouse inputs), transform the location of the zooming object (translates movement to zooming space coordinates), and call a damage method which determines how the display should be updated and communicates such information with the view manager 410.

In lieu of passing the event object to a targeted zooming object, the view manager 410 can create a new event object and pass it to the event manager 414 for a new target assignment. This can depend upon the state of the zooming environment and the type of event. The artisan will recognize the various alternatives.

Notably, the pick handler described in this example is not the only event handler associated with the view manager 410, and not all the events that are initially assigned to the view manager 410 identify a zooming object as a new target. For example, certain commands will cause a simple zooming operation, which can be handled by a zoom handler, which is another type of event handler referenced by the view manager 410.

According to another aspect of the present invention, the picking policy for determining whether zooming objects in the zooming view are targeted for processing an event is flexible and amenable to update. This is because, among other things, a pick handler can be edited independent from the zooming objects to which it can be associated. Also, alternative pick handlers can be interchangeably associated to the view manager 410 to provide different picking policies.

Figure 9A:
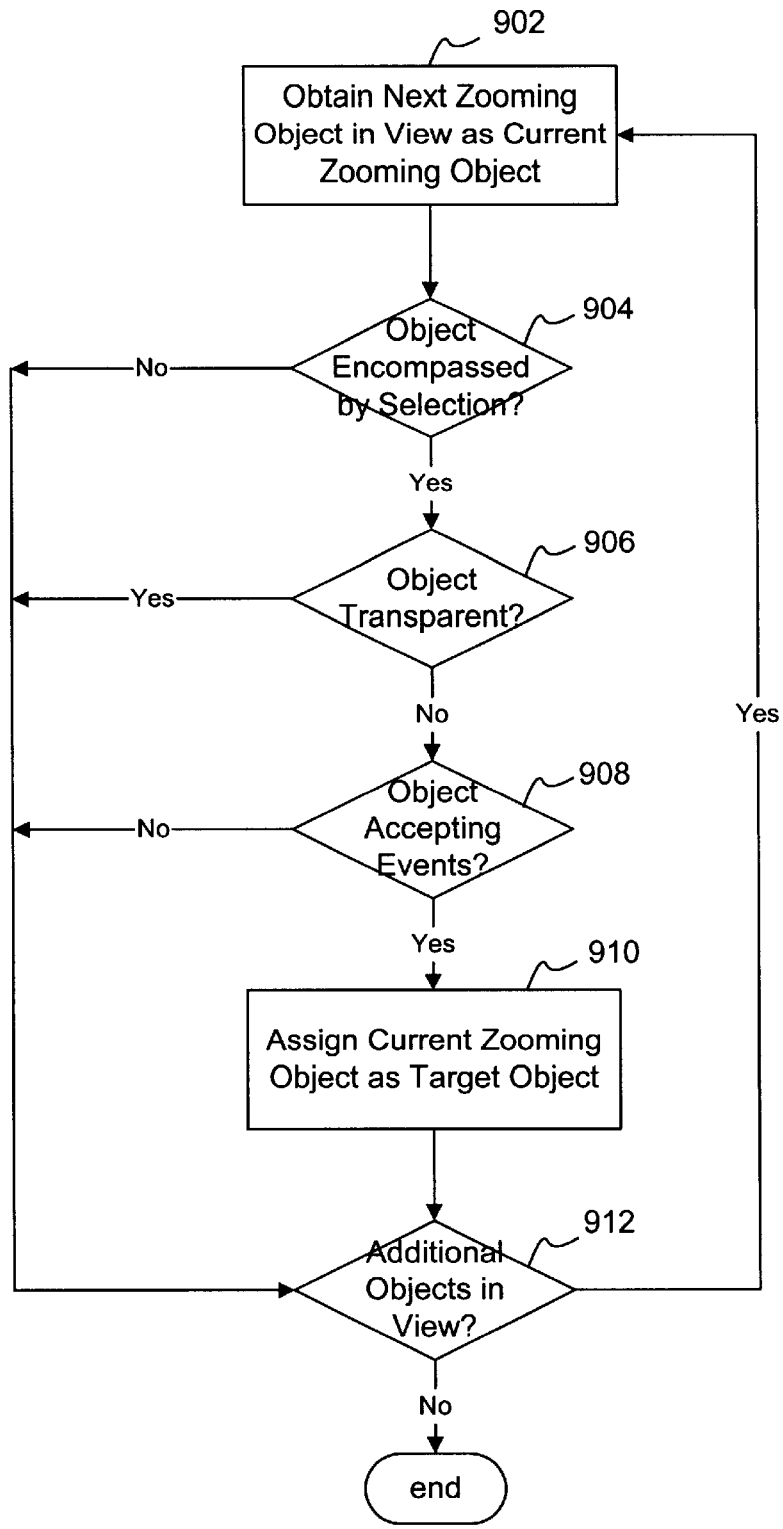
FIGS. 9A and 9B are flow charts illustrating alternative pick handling processes used in pick handling objects in accordance with the present invention.
Figure 9B:
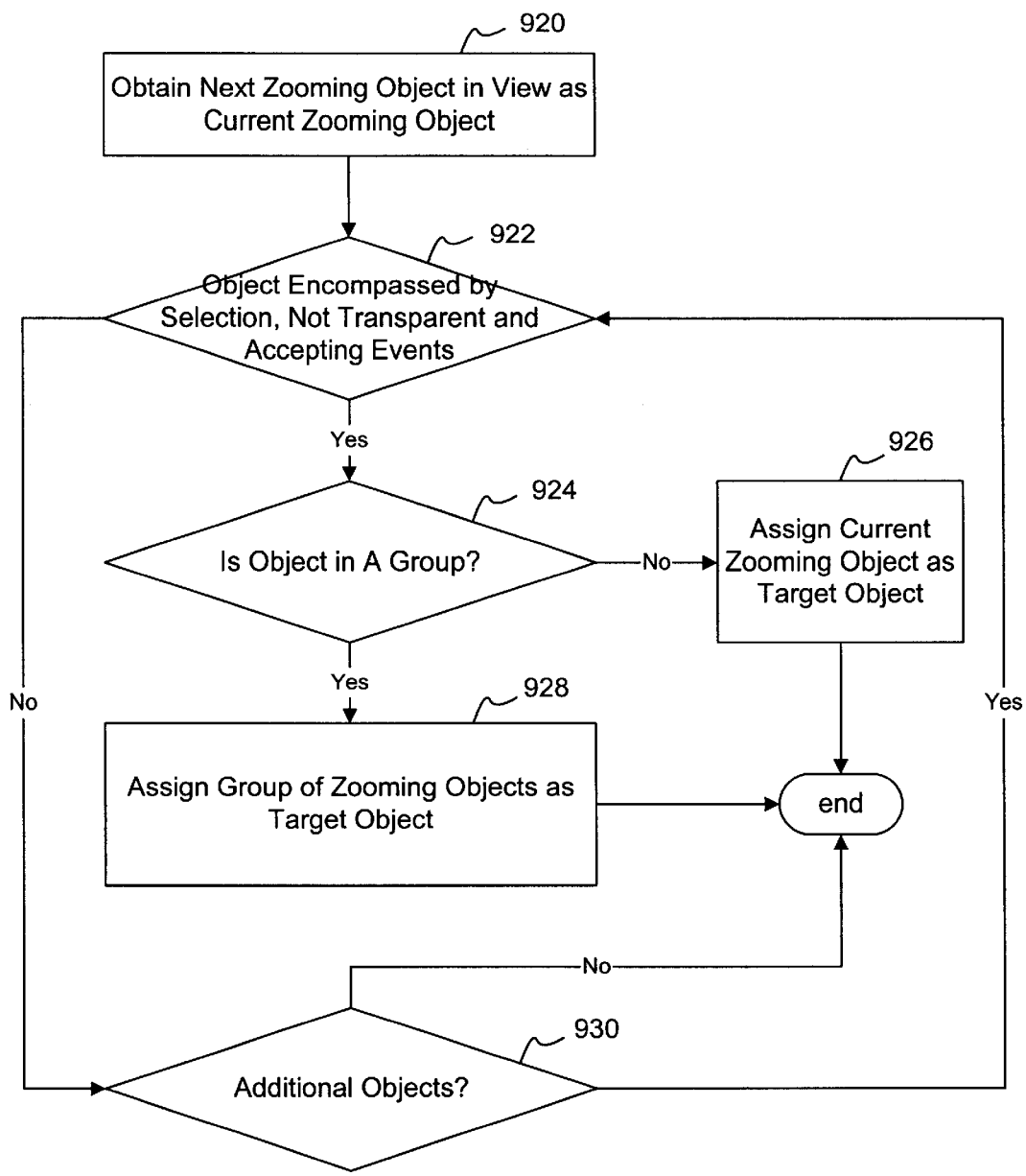

The flow charts of FIGS. 9A and 9B illustrate alternative picking policies. As described above, the view manager 410 typically references a pick handler for determining which zooming objects in the zooming view is targeted. The flow chart of FIG. 9A illustrates an example of a picking policy that iteratively determines whether each zooming object in the zooming view has been selected. A next object in the view is obtained (step 902), and it is then determined whether it has been encompassed by selection (step 904). This can be done by comparing the coordinates corresponding to a mouse selection to the coordinates of the zooming object on the display, with any necessary zooming space coordinate translation. If the current zooming object location does not intersect with the mouse selection, then the next object in the view can be obtained (step 902) if there are any remaining (per step 912). If the current zooming object has been encompassed by the mouse selection, then other criteria can be used, if desired, to ultimately determine whether the zooming object is targeted. For example, it can be determined (step 908) whether the zooming object is transparent, and then determined (step 910) whether the object is accepting events. Conventional flags can be used for these determinations. Transparency can be used to allow selection of certain zooming objects through those in the foreground, and event acceptance can be used to override apparent mouse selection where desired. If the zooming object is not transparent and accepts events, then the zooming object is assigned as the target object.

The flow chart of FIG. 9B illustrates the addition of object group decision making to the picking policy. This allows assignment of numerous grouped zooming objects as the target, without requiring iterative analysis of each individual object in the view. The next object in the view can be obtained for consideration as the current zooming object (step 920) and then analyzed to determine whether it is encompassed by the selection, transparent, and accepting events, (step 922) as described in connection with FIG. 9A. However, the picking policy of FIG. 9B adds a determination (step 924) as to whether the current zooming object belongs to a group of zooming objects. This can, for example, be done by checking a flag or the like to determine whether the zooming object is grouped, and by maintenance of grouped lists of zooming objects (or by calling a method that determines whether the object is grouped and gets the group list). If the object is grouped, then the group of zooming objects can be assigned as the target (step 926), but if the current zooming object is not grouped, then the individual zooming object can be assigned as the target (step 928).

According to another aspect of the present invention, event handling implements the instance and class level event handlers that can be associated with zooming objects. The functionality responsive to an event received by the zooming engine 222 can thus behave dynamically and polymorphically.

As described above, a given object, such as a zooming object, has associated event handlers which may be invoked in sequence. Specifically, instance level event handler references (if any) are associated with each instance of a given class. Additionally, class level event handler references can be stored for the given class, as well as any superclasses. The event handling can behave dynamically, because at runtime event an event handler can be added or removed from a given zooming object. Additionally, providing numerous associated event handlers supports polymorphic event handling.

The basic polymorphic event handling functionality is augmented with instance level and conditional event handling. Preferably, instance level event handlers are invoked prior to any class level event handlers. Instance level event handlers are typically used when the event handling behavior is not propagated to all objects of the class, i.e. the event handling behavior pertains only to that instance. Conditional event handling references the ability of an event handler to consume an event. This allows an event handler to complete a functionality, and to prevent an unnecessary (or counterproductive) functionality up the chain of event handlers from being invoked. Each event handler can issue a boolean value indicating whether an event has been consumed to implement conditional behavior.

For example, the class of zooming objects defined by the zooming object module 416 (which is all zooming objects) can have a class level event handler which provides a rectangular bounding box about a zooming object whenever the mouse is used to click on the zooming object. Thus, all zooming objects which are part of the class would have this event handling functionality. However, if different functionality responsive to a mouse click is desired for a subclass object (e.g., rectangle, video, etc.), then a different event handler (such as one that provides a circular boundary) could be installed on the subclass level, or even at the instance level.

In another example, the zooming object 416 class includes a "base button" subclass, which in turn has "image button" and "round button" subclasses. The base button level event handlers can provide behavior for any button (e.g., for receiving input located on the button), while subclass level event handlers (e.g. round button level event handlers) can define additional behavior (e.g., for changing the characteristics of round buttons when they are clicked), and still further behavior can be provided at the instance level (e.g., a particular round button has a specific response not necessarily shared by all round buttons).

Figure 10:
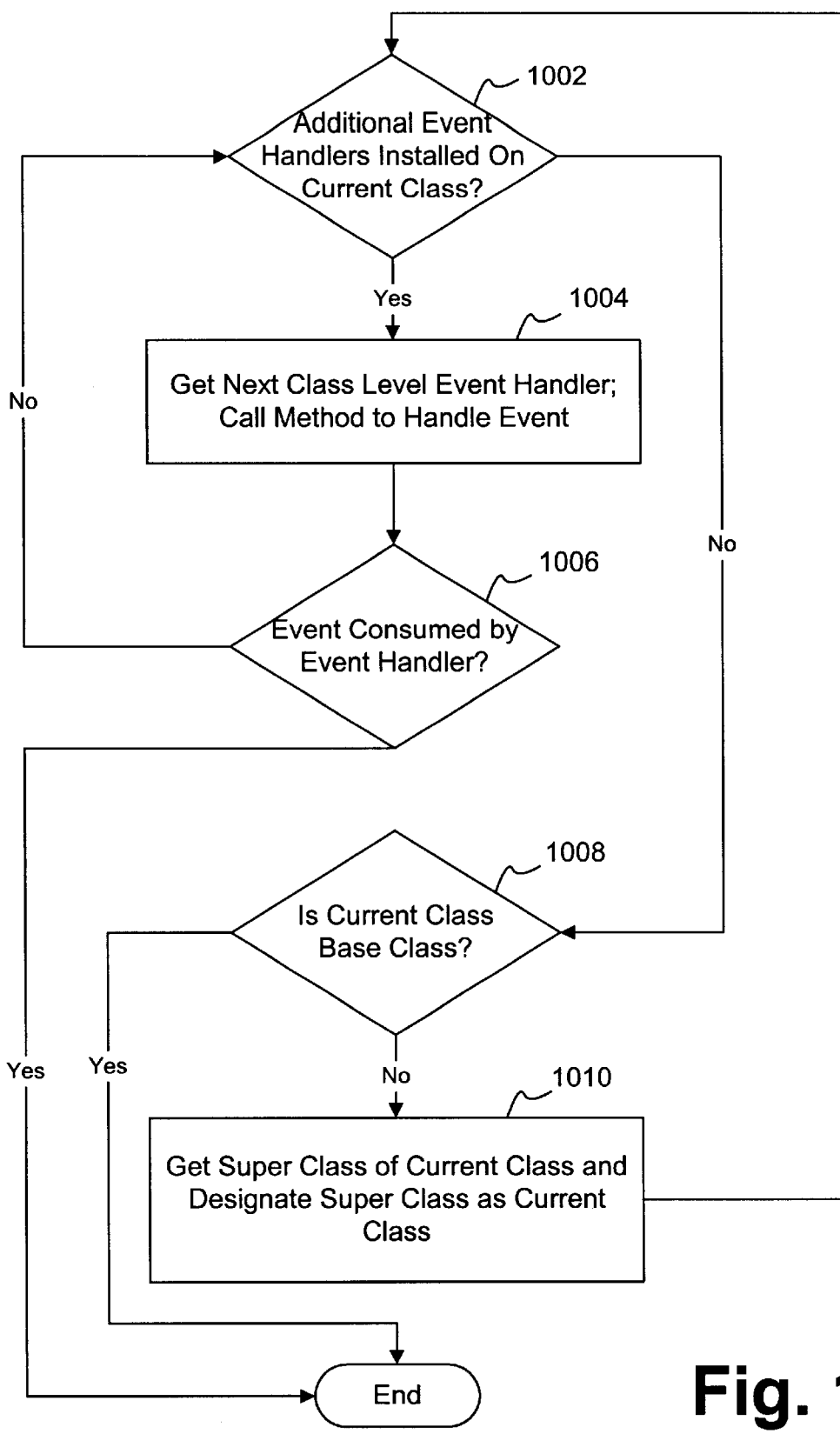
FIG. 10 is a flow chart illustrating an embodiment of polymorphic event handling in accordance with the present invention.

The flow chart of FIG. 10 further illustrates these event handling functionalities. First, it is determined whether any additional event handlers are installed on the current class (step 1002). If so, then the next event handler for that current class is obtained, and the event is handled according to that event handler (step 1004). If the event handler consumes (per step 1006) the event, then its handling is terminated. However, if the event is not consumed, then additional event handlers at the current class level are sought, and the steps of obtaining and handling the event with conditional consumption are repeated until the supply of event handlers at the current class level is exhausted.

Once the supply of event handlers at the current class level is exhausted (per step 1002), it is determined (step 1008) whether the current class is the base (or root) class. If so, then the event handling method terminates. If not, then the super class to the current class is designated as the current class, and the event handlers on that class are handled in the same fashion (steps 1002–1006). This process is repeated until any event handler consumes the event, or all event handlers at all class levels up to the base class level have been invoked.

Thus, a zooming engine for a zooming graphical user interface is provided in accordance with the present invention. Although the present invention has been described in considerable detail with reference to certain embodiments thereof, other embodiments are possible. For example, although the above described embodiment implements certain class names, it will be understood by the artisan that variously named objects can perform the underlying functionality. Therefore, the sprit and scope of the appended claims should not be limited to the description of the preferred embodiments contained herein.

What is claimed is:

1. A zooming engine for displaying zooming objects that reside in a zooming space on a display which provides a zooming view, the zooming engine comprising:

a zooming object class, which defines characteristics for a plurality of zooming objects that reside in a zooming space, wherein the relative locations of zooming objects can be independently changed in three dimensions within the zooming space;

a view manager, which manages the zooming view by identifying viewed zooming objects as those zooming objects from the plurality of zooming objects that reside in the zooming view; and an event manager, in communication with the view manager, which receives an event, determines whether the event pertains to the zooming view or to a targeted zooming object, and assigns the event to the view manager where the event pertains to the zooming view so that the view manager handles the event for the plurality of zooming objects that reside in the zooming view, whereby individual event handling requests to each of the plurality of zooming objects that reside in the zooming view are not required.

2. The zooming engine of claim 1, wherein the event manager assigns the event to the targeted zooming object when it is determined that the event pertains to the targeted zooming object.

3. The zooming engine of claim 2, further comprising:

an event handler, in communication with the targeted zooming object, which includes instructions for producing behavior responsive to the event.

4. The zooming engine of claim 3, wherein the behavior includes at least one of drawing a bounding box around the targeted zooming object and moving the targeted zooming object.

5. The zooming engine of claim 1, further comprising:

a pick handler, in communication with the view manager, which responds to the assignment of the event to the view manager by identifying a targeted zooming object from the viewed zooming objects.

6. The zooming engine of claim 5, wherein the event is assigned to the targeted zooming object after the targeted zooming object is identified by the pick handler.

7. The zooming engine of claim 5, wherein a plurality of targeted zooming objects are identified by the pick handler responsive to the assignment of the event to the view manager.

8. The zooming engine of claim 1, further comprising:

an event handler, in communication with the targeted zooming object, which includes instructions for producing behavior responsive to the event.

9. The zooming engine of claim 8, wherein the behavior includes at least one of drawing a bounding box around the targeted zooming object and moving the targeted zooming object.

10. A zooming engine for displaying zooming objects that reside in a zooming space on a display which provides a zooming view, the zooming engine comprising:

means for defining characteristics for a plurality of zooming objects that reside in a zooming space, wherein the relative locations of zooming objects can be changed in three dimensions within the zooming space;

means for managing the zooming view by identifying viewed zooming objects as those zooming objects from the plurality of zooming objects that reside in the zooming view; and means for receiving an event, determining whether the event pertains to the zooming view or to a targeted zooming object, and assigns the event to the view manager where the event pertains to the zooming view so that the view manager handles the event for the plurality of zooming objects that reside in the zooming view, whereby individual event handling requests to each of the plurality of zooming objects that reside in the zooming view are not required.

11. The zooming engine of claim 10, wherein the means for receiving an event assigns the event to the targeted zooming object when it is determined that the event pertains to the targeted zooming object.

12. The zooming engine of claim 11, further comprising:

event handling means for producing behavior responsive to the event.

13. The zooming engine of claim 12, wherein the behavior includes at least one of drawing a bounding box around the targeted zooming object and moving the targeted zooming object.

14. The zooming engine of claim 10, further comprising:

pick handling means for responding to the assignment of the event to the view manager by identifying a targeted zooming object from the viewed zooming objects.

15. The zooming engine of claim 14, wherein the event is assigned to the targeted zooming object after the targeted zooming object is identified by the means for responding.

16. The zooming engine of claim 14, wherein a plurality of targeted zooming objects are identified by the pick handling means responsive to the assignment of the event to the means for managing the zooming view.

17. The zooming engine of claim 10, further comprising:

event handling means for producing behavior responsive to the event.

18. The zooming engine of claim 17, wherein the behavior includes at least one of drawing a bounding box around the targeted zooming object and moving the targeted zooming object.

19. A method for displaying zooming objects that reside in a zooming space on a display which provides a zooming view, the method comprising:

defining characteristics for a plurality of zooming objects that reside in a zooming space, wherein the relative locations of zooming objects can be changed in three dimensions within the zooming space;

defining a view manager that manages the zooming view by identifying viewed zooming objects as those zooming objects from the plurality of zooming objects that reside in the zooming view;

receiving an event;

determining whether the event pertains to the zooming view or to a targeted zooming object; and assigning the event to the view manager where it is determined that the event pertains to the zooming view so that the event is handled at the zooming view level for the plurality of zooming objects that reside in the zooming view, whereby individual event handling requests to each of the plurality of zooming objects that reside in the zooming view are not required.

20. The method of claim 19, further comprising:

assigning the event to the targeted zooming object where it is determined that the event pertains to the targeted zooming object.

21. The method of claim 19, further comprising:

responding to the assignment of the event to the zooming view by identifying a targeted zooming object from the viewed zooming objects.

22. The method of claim 21, wherein the event is assigned to the targeted zooming object after the targeted zooming object is identified.

* * * * *